United States Patent
Beaudoin et al.

(10) Patent No.: US 10,359,191 B2
(45) Date of Patent: Jul. 23, 2019

(54) DIRECT-FIRED HEATING METHOD AND FACILITY FOR IMPLEMENTING SAME

(71) Applicant: L'Air Liquide, Societe Anonyme pour l'Etude et l'Exploitation des Procedes Georges Claude, Paris (FR)

(72) Inventors: Philippe Beaudoin, Guyancourt (FR); Pascal Del-Gallo, Dourdan (FR); Matthieu Flin, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 126 days.

(21) Appl. No.: 14/392,225

(22) PCT Filed: Jun. 26, 2014

(86) PCT No.: PCT/FR2014/051622
§ 371 (c)(1),
(2) Date: Dec. 24, 2015

(87) PCT Pub. No.: WO2014/207391
PCT Pub. Date: Dec. 31, 2014

(65) Prior Publication Data
US 2016/0186992 A1  Jun. 30, 2016

(30) Foreign Application Priority Data

Jun. 26, 2013 (FR) ..................... 13 56132
Jun. 26, 2013 (FR) ..................... 13 56136

(Continued)

(51) Int. Cl.
*F23G 5/027* (2006.01)
*F23G 5/14* (2006.01)
(Continued)

(52) U.S. Cl.
CPC ............ *F23G 5/0276* (2013.01); *C01B 3/384* (2013.01); *C10J 3/82* (2013.01); *F23G 5/14* (2013.01);
(Continued)

(58) Field of Classification Search
CPC ....... F23G 5/0276; F22B 31/045; F23B 90/06
(Continued)

(56) References Cited

U.S. PATENT DOCUMENTS 4,756,750 A  7/1988  Bixler et al.
5,119,844 A  6/1992  Cannon et al.
(Continued)

FOREIGN PATENT DOCUMENTS

DE  10057469 A1  5/2002
EP  0872690  10/1998
(Continued)

OTHER PUBLICATIONS

International Search Report and Written Opinion for PCT/FR2014/051622, dated Oct. 1, 2014.

*Primary Examiner* — Avinash A Savani
*Assistant Examiner* — Rabeeul I Zuberi
(74) *Attorney, Agent, or Firm* — Christopher J. Cronin

(57) ABSTRACT

The invention relates to a direct-fired heating method and to a facility for implementing same, According to said method, a load is heated in a furnace with heat generated by burning fuel with an oxidant; the smoke generated is evacuated from the furnace, the evacuated smoke containing residual heat energy; residual heat energy is recovered from the evacuated smoke and introduced into a synthesis reactor wherein syngas is produced; and at least part of the syngas is burned in the furnace in order to heat the load.

15 Claims, 2 Drawing Sheets

(30) Foreign Application Priority Data

| Jun. 26, 2013 | (FR) | ...................................... | 13 56141 |
| Dec. 10, 2013 | (FR) | ...................................... | 13 62343 |
| Dec. 10, 2013 | (FR) | ...................................... | 13 62346 |
| Dec. 10, 2013 | (FR) | ...................................... | 13 62347 |

(51) Int. Cl.
  *C10J 3/82* (2006.01)
  *C01B 3/38* (2006.01)

(52) U.S. Cl.
  CPC ............... *C01B 2203/0233* (2013.01); *C10J 2300/0969* (2013.01); *C10J 2300/0976* (2013.01); *C10J 2300/1215* (2013.01); *C10J 2300/1253* (2013.01); *C10J 2300/164* (2013.01); *C10J 2300/1853* (2013.01); *C10J 2300/1876* (2013.01); *C10J 2300/1884* (2013.01); *C10J 2300/1892* (2013.01); *C21B 2100/24* (2017.05); *C21B 2100/66* (2017.05); *Y02E 20/12* (2013.01); *Y02P 10/34* (2015.11); *Y02P 20/124* (2015.11); *Y02P 20/129* (2015.11)

(58) Field of Classification Search
  USPC .............. 431/278, 11, 89, 90, 37, 236, 5; 110/234, 229, 187, 231, 190
  See application file for complete search history.

(56) References Cited

U.S. PATENT DOCUMENTS

| 5,429,152 | A |   | 7/1995 | Van Straaten et al. |
| 5,467,722 | A | * | 11/1995 | Meratla ............... B01D 53/002 110/216 |
| 6,210,157 | B1 | * | 4/2001 | Kobayashi ............ F27D 17/001 432/181 |
| 6,837,910 | B1 |   | 1/2005 | Yoshikawa et al. |
| 2003/0008928 | A1 |   | 1/2003 | Klepper |
| 2004/0020793 | A1 |   | 2/2004 | Peterolff et al. |
| 2007/0270511 | A1 | * | 11/2007 | Melnichuk ............ C07C 29/149 518/700 |
| 2007/0289214 | A1 | * | 12/2007 | Briesch ................... C10J 3/463 48/61 |
| 2008/0196308 | A1 | * | 8/2008 | Hutton ...................... C10J 3/10 48/210 |
| 2009/0011290 | A1 |   | 1/2009 | Chudnovsky et al. |
| 2009/0272443 | A1 |   | 11/2009 | Lee |
| 2011/0220846 | A1 | * | 9/2011 | Banowetz ................. C10J 3/56 252/373 |
| 2011/0301386 | A1 | * | 12/2011 | Mamedov ........... C07C 29/1518 568/671 |
| 2012/0134888 | A1 |   | 5/2012 | Blevins et al. |
| 2013/0023707 | A1 | * | 1/2013 | Keefer ..................... C01B 3/38 585/312 |
| 2013/0126172 | A1 |   | 5/2013 | Klepper et al. |
| 2014/0004471 | A1 | * | 1/2014 | Vandergriendt ...... C04B 7/4446 431/12 |

FOREIGN PATENT DOCUMENTS

| EP |   | 1143200 | A2 |   | 10/2001 |   |   |
| EP |   | 2586481 | A1 |   | 5/2013 |   |   |
| WO | WO | 9508514 | A1 | * | 3/1995 | ............. | B09C 1/067 |
| WO |   | 2008149312 | A1 |   | 12/2008 |   |   |
| WO |   | 2009046522 | A1 |   | 4/2009 |   |   |
| WO | WO | 2009046522 | A1 | * | 4/2009 | ................ | C10J 3/20 |

\* cited by examiner

DIRECT-FIRED HEATING METHOD AND FACILITY FOR IMPLEMENTING SAME

CROSS-REFERENCE TO RELATED APPLICATIONS

This application is a § 371 of International PCT Application PCT/FR2014/051622, filed Jun. 26, 2014, which claims § 119(a) foreign priority to French patent application FR 1356132, filed Jun. 26, 2013, and French patent application FR 1356136, filed Jun. 26, 2013, and French patent application FR 1356141, filed Jun. 26, 2013, and French patent application FR 1362343, filed Dec. 10, 2013, and FR 1362346, filed Dec. 10, 2013, and FR 1362347, filed Dec. 10, 2013.

BACKGROUND

Field of the Invention

The present invention relates to industrial heating processes in which a feedstock is introduced into a furnace and heated by burning a fuel in the furnace.

Such industrial heating processes are, for example:
vitrification, such as, for example, the melting of glass,
the melting of metals, such as, for example, the second melting of metals, and
the reheating of metals.

The heating process can be continuous or batchwise.

RELATED ART

Industrial heating processes generally resort to fuels of fossil origin, such as natural gas, fuel oil or coal.

The combustion can be combustion with air or combustion with an oxidant having a greater oxygen content than that of air, such as air enriched in oxygen or substantially pure oxygen. Combustion with an oxidant richer in oxygen than air is known under the name of oxy-combustion.

Oxy-combustion has numerous advantages with respect to combustion with air, also known as air combustion:
reduction in NOx emissions,
reduction in the volume of flue gases generated,
reduction in fuel consumption and thus also in the emissions of $CO_2$ of fossil origin.

This reduction in fuel consumption is, however, limited when oxy-combustion is compared with air combustion processes which enable preheating of the combustion air by recovery of heat from the flue gases generated by the combustion.

In order to improve the economic performance of oxy-combustion, attempts are being made to reduce the fuel consumption even more by:
the type and the design of the oxy-fuel burner,
the design of the combustion chamber, enabling in particular a lowering in the temperature of the flue gases at the outlet of the furnace, a reduction in the heat losses, and the like,
the preheating of the oxidant and/or the fuel by recovery of heat from the generated flue gases.

However, these techniques relatively rapidly reach a ceiling and the difference between the most efficient process with oxy-combustion and the most efficient combustion process with preheated air remains small. This restricts the market for oxy-combustion in industrial heating processes.

US-A-20090011290 describes a thermochemical recovery process. According to this process, a portion of the flue gases resulting from the combustion furnace is used as reactant for the reforming of a fuel. The reformed fuel is burnt in the combustion furnace. Before being used as reactant for the reforming, the flue gases resulting from the furnace are used as heat-exchange fluid for the preheating of the combustion oxidant and of the reformed fuel in recuperators upstream of their introduction into the combustion furnace.

Such a use of flue gases for the preheating of fuel and fuel oxidizer in recuperators is possible in an industrial plant only when the flue gases are poor in contaminants (condensable materials) capable of being deposited on the walls of the recuperators.

EP-A-1 143 200 discloses a combustion process in a furnace, such as a glass melting furnace, in which use is made, as fuel, of the synthesis products resulting from an endothermic chemical reaction, such as synthesis gas or syngas. The production of said synthesis products takes place in two regenerators which operate alternately and which are heated by flue gases coming from a source other than the furnace in which the synthesis products are used as fuel.

This is because the flue gases resulting from a glass melting furnace are heavily laden with condensable materials. Said other source of flue gases can be another plant on the industrial site which produces relatively clean flue gas or a plant for the combustion of a fuel with air specifically provided for the production of hot flue gases for the heating of the two regenerators.

The first scenario can be envisaged only if there exists a plant producing relatively clean flue gases in the proximity of the furnace and, in this case, the use of the combustion process in the furnace will depend on the simultaneous operation of this other plant. The second scenario requires the construction and the operation of an additional combustion plant, which is particularly expensive.

In any case, the process described in EP-A-1 143 200 does not significantly improve the energy balance of the furnace in so far as said process depends on an additional external thermal energy source.

SUMMARY OF THE INVENTION

The present invention is made in the context of techniques for reducing fuel consumption and reducing emissions of $CO_2$ of fossil origin in high-temperature industrial heating processes. The aim of the present invention is to overcome, at least partially, the problems associated with the known processes described above.

DETAILED DESCRIPTION OF THE INVENTION

The present invention covers in particular a direct-fired heating process.

According to this process, a feedstock F to be heated is introduced into a furnace 300. Fuel is burnt with the oxidant in the furnace 300. The feedstock F is heated in the furnace (300) with the heat generated by this combustion and the heated feedstock is discharged from the furnace 300. The flue gases generated by the combustion are also discharged from the furnace 300, these discharged flue gases containing residual thermal energy which has not been absorbed by the feedstock F in the furnace 300.

According to the process, syngas is also produced in a synthesis reactor, this being achieved by an endothermic chemical reaction between reactants including, on the one hand, a carbon-based material and, on the other hand, steam (102) and/or $CO_2$. For this purpose, the synthesis reactor comprises at least one reaction region into which the reactants are introduced, in which the endothermic chemical reaction takes place and from where the syngas produced is extracted.

According to the present invention, residual thermal energy is recovered from the discharged flue gases and at least a portion of the recovered residual thermal energy is introduced into the synthesis reactor, where this at least a portion of the recovered residual thermal energy is consumed by the abovementioned endothermic chemical reaction.

At least a portion of the syngas produced by the reaction is introduced into the furnace, so that at least a portion of the fuel burnt in the furnace is syngas resulting from the synthesis reactor.

The invention thus makes it possible to improve the energy efficiency of the process by recovering at least a portion of the residual energy discharged from the furnace with the flue gases, by using at least a portion of the residual energy recovered in the synthesis of syngas and by using at least a portion of the syngas produced as fuel in the generation of heat in the furnace.

According to a specific embodiment, the synthesis reactor comprises not only at least one reaction region but also at least one heating chamber into which the at least a portion of the residual energy recovered is introduced.

In this case, the at least one heating chamber is positioned with respect to the at least one reaction region so that recovered thermal energy is transmitted from the heating chamber to the reaction region through a separating wall separating the reaction region from the heating chamber.

Figure 1:
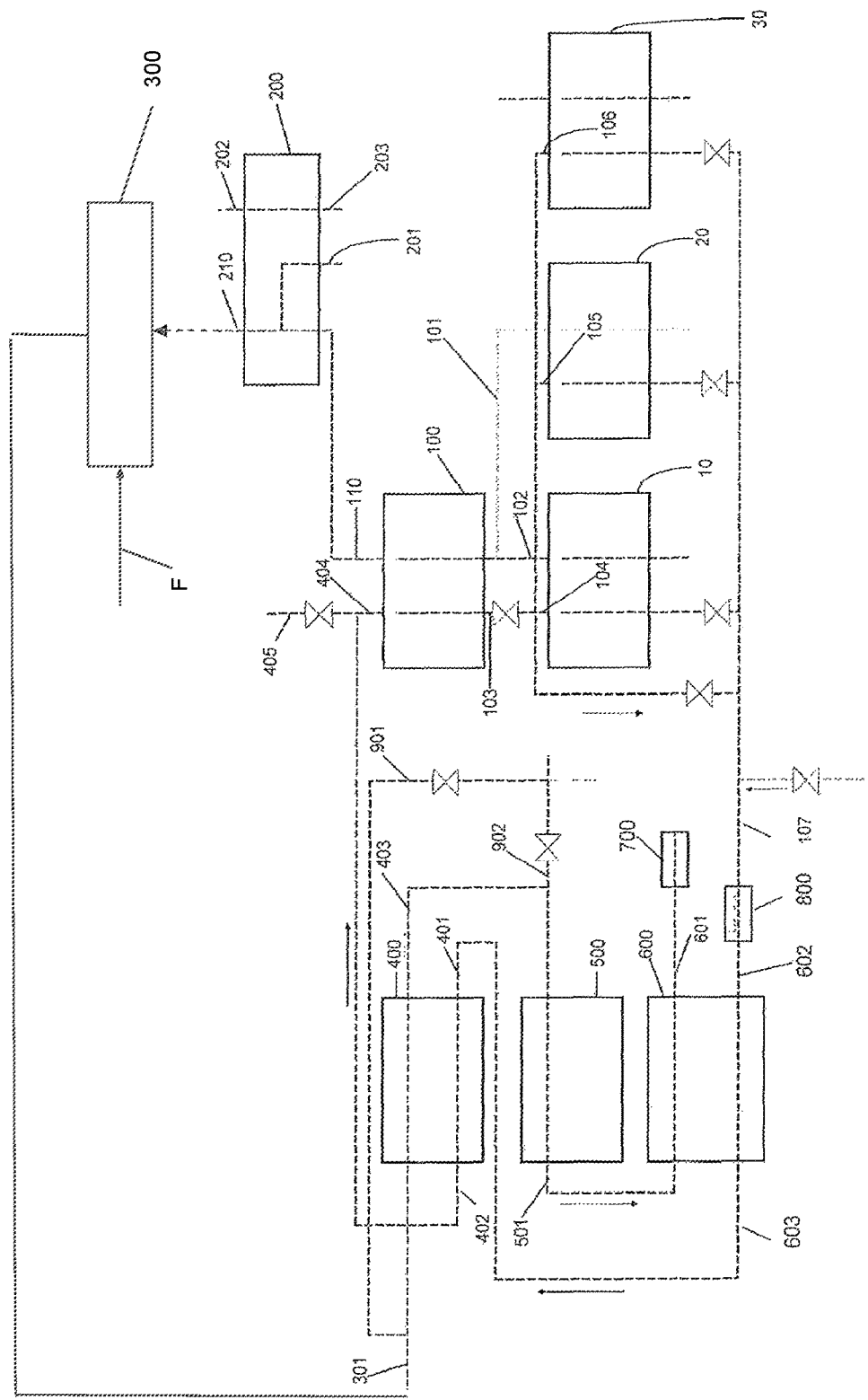
FIG. 1 illustrates a diagrammatic representation of a heating process/plant according to the invention using natural gas as carbon-based material in the synthesis of syngas by SMR.
Figure 2:
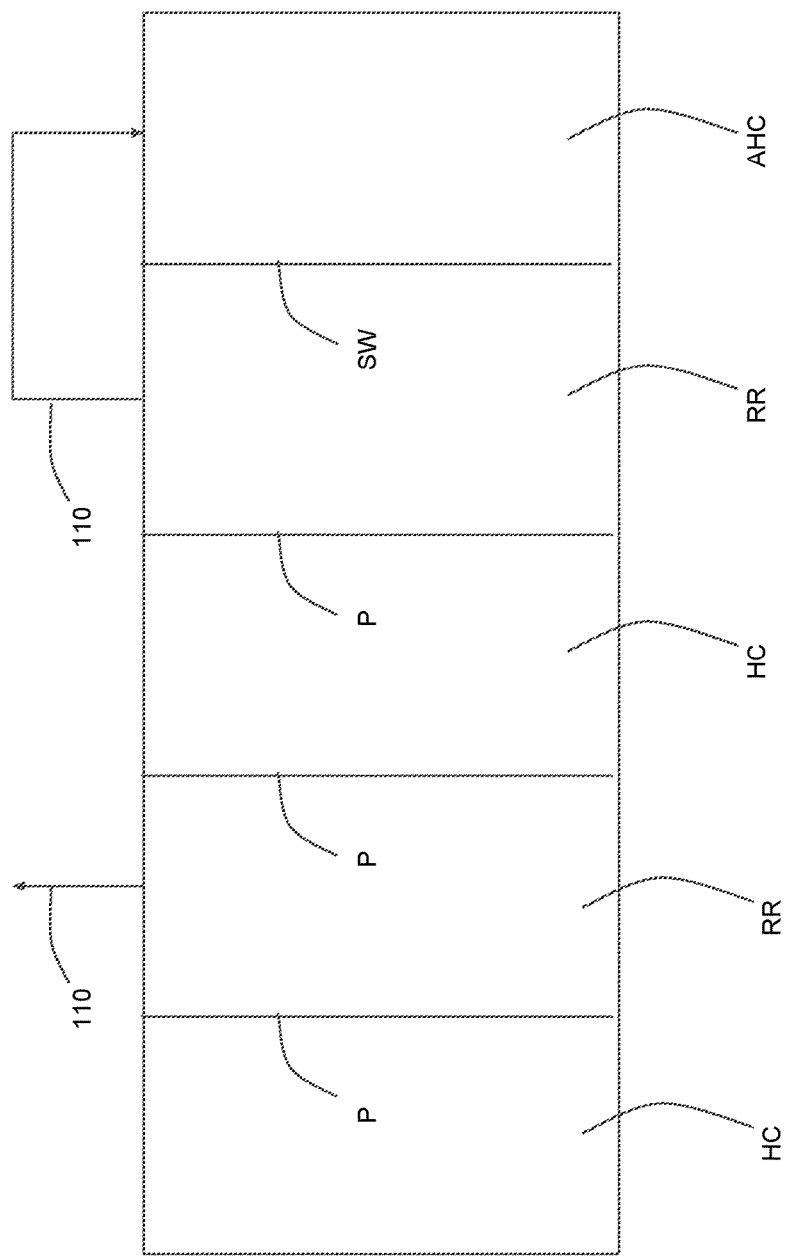
FIG. 2 illustrates a diagrammatical representation of a particular embodiment of the synthesis reactor.

Each reaction region is, for example, surrounded by a neighboring heating chamber or housed between two neighboring heating chambers. According to an advantageous embodiment and as illustrated in FIG. 2, the synthesis reactor (100) has a lamellar structure comprising an alternation of heating chambers HC and of reaction regions RR: a heating chamber HC, followed by a reaction region RR, followed by a heating chamber HC, and the like. Said heating chambers HC and said reaction regions RR are then situated between two successive plates P.

According to a particularly advantageous embodiment, an additional thermal energy recovery is carried out on the syngas produced in the reactor.

To this end, the hot syngas 110 obtained at the end of the synthesis reaction is circulated in a heating chamber, referred to as additional heating chamber AHC, situated inside the synthesis rector 100, so that at least a portion of the heat from the syngas 110 produced is transferred to the at least one reaction region RR. Said transfer is again carried out through a separating wall SW which separates the additional heating chamber AHC and the at least one reaction region RR.

This embodiment of the invention is particularly useful in the case where water is extracted from the syngas before it is used as fuel in the furnace (see below).

According to a specific embodiment, thermal energy is introduced into the at least one heating chamber by introducing one or more streams of discharged flue gases into said at least one chamber as thermal energy source(s).

Such an embodiment is useful in particular when the discharged flue gases contain little or no dust and contain little or no volatile substances which can be deposited inside the heating chambers or can condense at the temperatures which prevail in the chamber(s), in particular at the separating walls with the reaction region(s).

It can in principle be envisaged to remove dust from the discharged flue gases at high temperature before the introduction of one or more streams of discharged flue gases into the heating chamber(s) but such a dust-removing process is generally expensive.

According to one embodiment of the invention, thermal energy is recovered from the discharged flue gases by heat exchange with a heat-exchange fluid.

Residual thermal energy is then recovered from the flue gases discharged from the furnace by heat exchange with a heat-exchange fluid so as to obtain a heated heat-exchange fluid containing recovered residual thermal energy. At least a portion of said heated heat-exchange fluid is subsequently introduced into the synthesis reactor and used as thermal energy source for the endothermic chemical reaction. In this case, thermal energy is advantageously introduced into the at least one heating chamber by introducing at least a portion of the heated heat-exchange fluid into the at least one heating chamber.

The flue gases resulting from the furnace are often laden with dust and/or volatile substances capable of condensing at temperatures in the range referred to as "condensation range", generally from 600° C. to 800° C. and in particular from 600° C. to 700° C. The dust and/or the condensable substances can result from the combustion which takes place in the furnace, in particular when the syngas is not the only fuel burnt. The dust and/or the condensable substances present in the flue gases can also have other origins, such as, for example, the entrainment or the volatilization of a portion of the feedstock to be heated or melted in the furnace.

According to a preferred embodiment of the invention, the thermal energy recovery stage comprises at least a first phase of recovery at a first range of temperatures of flue gases and a second phase of recovery at a second range of temperatures.

The first range of temperatures is then chosen so that there is no condensation of volatile substances present in the flue gases at these temperatures. When the flue gases resulting from the furnace are laden with volatile substances as defined above, a range above the condensation range is thus chosen as first range of temperatures.

Between the first and the second phase of recovery, the flue gases are subjected to a cleaning operation which comprises the removal of dust and/or volatile substances capable of condensing at the temperatures of the second range of temperatures.

Owing to the fact that, at this stage, the flue gases are partially cooled, this cleaning operation is possible at a reduced cost.

When the flue gases contain volatile substances as defined above, the cleaning stage enables an additional and efficient recovery of thermal energy from the flue gases in the second range of temperatures, even if this second range overlaps or is below the condensation range.

The present invention thus enables an effective and lasting recovery of thermal energy present in the flue gases discharged from the furnace, even if said discharged flue gases are laden with dust and/or condensable substances. The recovery of residual thermal energy during the first and/or the second phase of recovery can be carried out in particular, as described above, by heat exchange between the discharged flue gases and a heat-exchange fluid and/or the transfer of the residual energy recovered to the endothermic chemical reaction can be carried out by means of one or more heating chambers, also as described above. According to a specific embodiment, one and the same heat-exchange fluid is used in the first and in the second phase of recovery.

In this case, the heat-exchange fluid is preferably heated partially by heat exchange with the flue gases in the second phase of recovery of the stage, that is to say at the second range of temperatures of the flue gases. The heat-exchange fluid partially heated in this second phase of recovery is subsequently heated by heat exchange with the flue gases in the first phase of recovery, that is to say at the first range of temperatures of the flue gases, which is above the second range.

The carbon-based material of the reactants of the endothermic chemical reaction is advantageously a gaseous carbon-based material, preferably natural gas or methane.

This carbon-based material, such as, for example, natural gas, is advantageously subjected to a hydrotreating stage upstream of the endothermic chemical reaction. Usefully:

$H_2$ is introduced into the carbon-based material in a catalytic hydrogenation reactor, so as to convert the S present in the carbon-based material into $H_2S$ but also to convert the Cl possibly present in the carbon-based material into HCl and to convert the unsaturated carbon-based compounds into saturated carbon-based compounds, the $H_2S$ and HCl thus formed are subsequently separated from the carbon-based material.

The separation of $H_2S$ and of HCl formed from the carbon-based material is preferably carried out by adsorption.

It is in particular possible to adsorb the $H_2S$ in a bed of zinc oxide and the HCl, if Cl was present in the carbon-based material, on a bed of potassium-based adsorbent. The bed of adsorbent is changed when a given level of saturation is achieved and is replaced with a new bed of adsorbent.

The carbon-based material can also, in the case of natural gas, be subjected to a preliminary "prereforming" stage which takes place in a specific reactor and which is targeted at removing the heavy hydrocarbons (containing more than two carbon atoms).

This stage can be carried out upstream of the synthesis reactor in order to prevent possible problems of formation of solid carbon by thermal cracking of these hydrocarbons in the synthesis reactor. It is also possible to produce syngas in two synthesis reactors operating alternately.

According to a preferred embodiment, at least a portion, indeed even all, of the fuel is burnt in the furnace with an oxygen-rich oxidant. The term "oxygen-rich oxidant" is understood to mean an oxidant having an oxygen content greater than the oxygen content of air. Preferably, the oxygen-rich oxidant presents an oxygen content of at least 80 vol %, more preferably of at least 90 vol % and more preferably still of at least 95 vol %, indeed even of at least 99 vol % and up to 100 vol %.

Thus, the process according to the invention can be a process using oxygen-enriched air as oxidant; a process with oxyboosting, that is to say a process in which at least 25% but less than 100% of the heat generated by the combustion of the fuel in the furnace is generated by combustion with an oxidant having an oxygen content of at least 80 vol %; a mixed air-oxy combustion process, that is to say a process in which at least 25% of the heat generated by the combustion of the fuel is generated by combustion in the furnace with an oxidant having an oxygen content of at least 80 vol %, the remainder being generated by combustion with air as oxidant; or also an all-oxy process, that is to say a process in which all of the heat generated by combustion in the furnace is generated with an oxidant having an oxygen content of at least 80 vol %.

The furnace can be a reheating furnace or a melting furnace. The furnace can in particular be a vitrification furnace, such as, for example, a glass melting furnace, comprising at least one of the following structures: a melting chamber, a refining chamber and a glass feeder. The melting chamber can also be a melting-refining chamber incorporating a melting zone and a refining zone.

The furnace can also be a furnace for the melting of metals, such as, for example, a furnace for the second melting of metals, such as aluminum, lead, and the like.

The endothermic chemical reaction is typically SMR (Steam Methane Reforming) or DMR (Dry Methane Reforming) or a mixture of the two.

According to one embodiment, at least a portion of the discharged flue gases, indeed even of the cleaned flue gases obtained in the recovery stage, is used as reactant in the endothermic chemical process of the stage for the production of syngas.

This is because these cleaned flue gases contain $CO_2$ and steam and can thus be used as reactant in the endothermic chemical reaction.

When the process comprises a second phase of recovery, thermal energy from the flue gases is advantageously recovered, at least in the first phase of the stage of recovery and preferably in the first and in the second phase of the stage of recovery, by heat exchange with a heat-exchange fluid. The heat exchange between the flue gases and the heat-exchange fluid is advantageously carried out by means of one or more recuperators.

Thus, use will usefully be made of a first recuperator for the heat exchange between the flue gases and the heat-exchange fluid in the first phase of the stage of recovery and of a second recuperator for this heat exchange in the second phase of this stage of recovery.

The preferred heat-exchange fluids are air, nitrogen and steam.

When the heat-exchange fluid is steam, it is possible to use at least a portion of the heat-exchange fluid heated in the recovery stage, that is to say: steam thus heated in the recovery stage, as reactant in the endothermic chemical process for the production of syngas.

The heat-exchange fluid can be used in an open circuit, for example with air as heat-exchange fluid or when the heat-exchange fluid is steam, which is subsequently used as reactant. The heat-exchange fluid can also be used in a closed circuit.

In this case, at least a portion of the heat-exchange fluid is returned to the recovery stage after it is used as thermal energy source in the endothermic chemical reaction.

When the thermal energy recovered from the discharged flue gases is greater than the thermal energy consumed by the endothermic chemical reaction, the recovered surplus thermal energy can be used for other purposes, in parallel with or downstream of the endothermic chemical reaction/ the synthesis reactor.

Thus, it is possible to use a portion of the recovered thermal energy in order to preheat the carbon-based material before it is used as reactant in the endothermic chemical reaction.

Another possibility is to use a portion of the recovered thermal energy in order to generate and/or superheat steam before it is used as reactant in the endothermic chemical reaction and/or to use a portion of the recovered thermal energy in order to preheat $CO_2$ before it is used as reactant in the endothermic chemical reaction.

A portion of the recovered thermal energy can also be used to preheat the oxidant upstream of its use in the combustion of the fuel.

Advantageously, water is extracted from the syngas by condensation before it is used as fuel in the furnace.

The present invention also relates to a heating plant suitable for the implementation of the process according to any one of the embodiments described above.

Such a plant comprises in particular the following items of equipment:
- a reactor for the synthesis of syngas,
- a furnace provided with one or more burners for the combustion of a fuel with an oxidant and at least one outlet for flue gases,
- a plant for the recovery of thermal energy by heat exchange between the flue gases and a heat-exchange fluid and comprising an outlet for heated heat-exchange fluid.

According to the invention, said items of equipment are connected so as to enable the implementation of the process according to the invention. This implies in particular that:
- the synthesis reactor be connected to the furnace so as to enable the provision of syngas produced in the reactor as fuel to at least one burner of the furnace,
- the outlet for the flue gases from the furnace be connected to the plant for the recovery of thermal energy so as to enable the provision of flue gases resulting from the furnace to said recovery plant,
- the outlet for the heated heat-exchange fluid from the plant for the recovery of thermal energy be connected to the reactor for the synthesis of syngas so as to enable the provision of at least a portion of the heated heat-exchange fluid to the synthesis reactor.

According to a preferred embodiment, the recovery plant comprises a first item of equipment for recovering thermal energy and a second item of equipment for recovering thermal energy. The first and the second items of equipment are preferably heat exchangers, as described above. The outlet for the flue gases from the furnace is then connected to the first item of equipment for recovering thermal energy, so as to enable the provision of flue gases resulting from the first item of equipment resulting from the furnace to said first item of equipment. The first item of equipment is advantageously connected to a plant for cleaning flue gases, so as to enable the provision of flue gases resulting from the first item of equipment to the cleaning plant.

The cleaning plant in its turn is connected to the second item of equipment for recovering thermal energy, so as to enable the provision of cleaned flue gases resulting from the cleaning plant to said second item of recovery equipment.

The plant for the recovery of thermal energy preferably comprises at least one heat exchanger which enables the recovery of thermal energy from the flue gases by heat exchange with a heat-exchange fluid.

The plant according to the invention can be adapted for the implementation of any one of the embodiments of the heating process according to the invention. Thus, for the combustion of a fuel with a fuel oxidizer, the furnace is not only connected to one or more sources of fuel, and in particular at least to the synthesis reactor as source of syngas as fuel, but also to one or more sources of oxidant.

According to an advantageous embodiment, the furnace is connected to at least one source of an oxidant having an oxygen content greater than the oxygen content of air. Said oxidant is provided as fuel oxidizer to at least one burner of the furnace. Usefully, said oxidant exhibits an oxygen content of greater than 80 vol % $O_2$, preferably than 90 vol % $O_2$, more preferably greater than 95 vol % $O_2$ and more preferably still greater than 99 vol % $O_2$.

The comparative example below describes the present invention and its advantages in more detail, reference being made to the FIGURE, which is a diagrammatic representation of a heating process/plant according to the invention using natural gas as carbon-based material in the synthesis of syngas by SMR. The FIGURE more particularly illustrates such a process/plant according to the invention which is particularly suitable for the heating of a glass melting furnace.

According to the example, the syngas is synthesized in the synthesis reactor 100 by endothermic catalytic reaction between preheated natural gas 101 and steam 102, these two reactants having a temperature at the inlet of the reactor 100 of at least 300° C., more particularly of 325° C.

The syngas 110 generated by catalytic SMR in the reactor 100 and predominantly composed of $H_2$ and CO is subsequently sent to the furnace 300 (not illustrated), in which the syngas 110 acts as fuel. In the furnace 300, the thermal energy generated by this combustion is used for the melting of vitrifiable materials. Table 1 gives the composition and the NCV (Net Calorific Value) of the syngas thus generated from the natural gas and compares the NCV of 1 $Nm^3$ of the syngas generated with the NCV of the 0.209 $Nm^3$ of natural gas ($CH_4$) consumed for the production of 1 $Nm^3$ of syngas.

TABLE 1

| Composition of the syngas | | |
|---|---|---|
| $CH_4$ | 0.25% | |
| $H_2O$ | 13.28% | |
| $H_2$ | 65.78% | |
| CO | 16.98% | |
| $CO_2$ | 3.71% | |
| NCV | 2229.04 | $kcal/Nm^{3*}$ |
| NCV of 1 $Nm^3$ | 2229.04 | kcal |
| Δ energy syngas - natural gas | 25% | |
| Natural gas | | |
| NCV | 8534 | $kcal/Nm^{3*}$ |
| NCV of 0.209 $Nm^3$ | 1784 | kcal |

The syngas 110 generated in the reactor 100 can be directly sent to the furnace 300 or, as in the illustrated case, can first be subjected to a stage of at least partial condensation of the steam present in the syngas before it is used as fuel.

This makes it possible to increase the NCV of the syngas and to control (reduce) the moisture content in the atmosphere of the furnace. This condensation takes place in the condenser 200. The water recovered 201 can, for example, be used in the production of the steam 102 upstream of the reactor 100. Preferably, the energy of condensation of water is recovered. It is thus possible to use cooling water 202 for the condensation of the steam in the condenser 200 and to use the heated water/steam 203 resulting from the condenser 200 in the production of steam 102 upstream of the reactor 100 or, more generally, as source of thermal energy.

The dry syngas 210 resulting from the condenser 200 is subsequently sent to the furnace 300, where the dry syngas 210 is used as fuel.

In the illustrated case, the syngas is the only fuel used in the furnace 300. The furnace is an all-oxy furnace, that is to say that the only fuel oxidizer used in the furnace is an oxidant having an oxygen content of 80 vol % to 100 vol %.

According to another embodiment, the syngas can be used in combination with another fuel.

Analogously, the furnace can also combine, on the one hand, oxy-combustion as defined above with, on the other hand, an oxidant which is poorer in oxygen, such as, for example, air.

The flue gases 301 generated by the combustion are discharged from the furnace 300. They are at high temperature, of the order of 1250° C. in the illustrated example. They are first sent to a first recuperator 400, referred to as "high-temperature recuperator". In this first recuperator 400, the flue gases are used to heat a heat-exchange fluid (air, in the illustrated case). At least a portion 404 of the heat-exchange fluid 402 thus heated is sent to the reactor 100 and is used therein as energy source in the endothermic chemical reaction for the synthesis of syngas.

Another portion 405 of the heated heat-exchange fluid 402 is sent to other items of equipment which consume heat.

In the illustrated case, the air used as heat-exchange fluid is heated to a temperature of 800° C. in the first recuperator 400. The first recuperator 400 is operated so that the volatile substances present in the flue gases 301 do not condense inside said first recuperator. In the illustrated case, the flue gases 403 are discharged from the first recuperator at a temperature of 800° C.

When the flue gases discharged from the furnace 300 are laden with particles (dust), care is taken to maintain the flow rate of said flue gases inside the first recuperator 400 at a level sufficiently high to prevent any accumulation of particles inside said first recuperator 400.

These moderated flue gases 403 are sent to a cleaning plant 500. In this plant, said flue gases 403 are subjected to a cleaning treatment, that is to say to a treatment for removal of dust and/or to a stage of removal of condensable volatile substances.

The cleaning processes used are chosen so as to prevent excessively great cooling of the flue gases during the cleaning treatment, so as to limit the thermal energy losses during the cleaning. For example, cleaning by means of high-temperature filters will be chosen.

The cleaned flue gases 501 are sent to a second recuperator 600, referred to as "low-temperature recuperator".

In this second recuperator, residual energy from the cleaned flue gases 501 is recovered by heat exchange with a heat-exchange fluid 602. The cooled flue gases 601 are then sent to an extractor 700 before being released into the atmosphere or being treated and collected.

By virtue of the cleaning of the flue gases in the cleaning plant, in which cleaning stage the volatile substances capable of condensing at the temperatures of the flue gases in the low-temperature recuperator 600 are removed from said flue gases, it is possible to recover residual thermal energy from the flue gases without fouling the low-temperature recuperator 600. The present invention thus enables optimal recovery of the heat present in the flue gases 301 at the outlet of the furnace 300.

In the illustrated case, the heat-exchange fluid 602 for the second recuperator 600 is compressed air provided by the blower 800.

It is possible to use two different heat-exchange fluids 401, 602 for the first and the second recuperators 400, 600 and to use the two heat-exchange fluids thus heated 402, 603 as sources of thermal energy in the process according to the invention, for example in the synthesis reactor 100.

In the illustrated case, the same heat-exchange fluid is used in the first and the second recuperators 400, 600.

The compressed air 602 provided by the blower 800 is first sent to the low-temperature recuperator 600. In said recuperator 600, the air is heated by heat exchange with the cleaned flue gases 501 resulting from the cleaning plant 500. The air (heat-exchange fluid) thus heated 603, which in the illustrated case is at a temperature of the order of 500° C., is subsequently introduced into the high-temperature recuperator 400.

In the high-temperature recuperator 400, the heated air resulting from the first low-temperature recuperator 600 is again heated by heat exchange with the uncleaned flue gases 301 resulting from the furnace 300. In the illustrated case, the hot air (heat-exchange fluid) 402 exits from the high-temperature recuperator at approximately 800° C.

In order to enable better control of the temperature of the flue gases at the inlet of the first recuperator 400 and/or of the cleaning plant 500 (for example, for reasons of thermal resistance of the materials and in order to optimize the cleaning), pipes are provided for the injection, at a controlled flow rate, of a moderated gas 901, 902 respectively into the flue gases 301 upstream of the first recuperator and/or into the flue gases 403 upstream of the cleaning plant 500. The moderated gas can, for example, be ambient air and/or a portion of the heat-exchange fluid 107 at the outlet of the reactor 100 and/or of the recuperators/exchangers 10, 20 or 30.

The residual thermal energy present in the heat-exchange fluid 103 at the outlet of the reactor 100 is advantageously used for the preheating of the reactants used in the process according to the invention.

Thus, in the illustrated case, a first portion 104 of the heat-exchange fluid is sent to the recuperator/the boiler 10 for the generation of the steam 102 used in the synthesis of the syngas.

A second portion 105 of the heat-exchange fluid is sent to a recuperator 20 for the preheating of the carbon-based material (natural gas) for the reaction for the synthesis of syngas.

A third portion 106 of the heat-exchange fluid is sent to a second recuperator 30 for the preheating of the fuel oxidizer (oxygen) before it is introduced into the furnace.

It is also possible to use at least a portion of the heat-exchange fluid 103 resulting from the reactor 100 for the preheating of the syngas 210 upstream of the furnace 300.

If a second fuel is also burnt in the furnace 300, at least a portion of the heat-exchange fluid 103 can be used for the preheating of the second fuel and/or of the syngas 210 upstream of the furnace 300.

It is possible, for example, to use a portion of the natural gas preheated in the exchanger 20 as fuel in the furnace 300.

The aim in general is to recover and to use a maximum of the thermal energy present in the flue gases 301 at the outlet of the furnace.

In the illustrated case, the heat-exchange fluid circulates in a closed circuit, that is to say that the heat-exchange fluid resulting from the reactor 100 is reused as heat-exchange fluid 602 in the recuperators 600 and 400. It is also possible to use the heat-exchange fluid in an open circuit.

The energy efficiency of the process according to the invention, applied to a glass melting furnace, was compared with the energy efficiency of the most efficient known processes for the melting of glass.

In tables 2 to 3 below:

$AA_1$: relates to a glass melting furnace according to the prior art using combustion of natural gas with, as fuel oxidizer, air preheated by means of new regenerators;

$AA_2$: relates to a glass melting furnace according to the prior art using combustion of natural gas with nonpreheated oxygen as fuel oxidizer;

$AA_3$: relates to a glass melting furnace according to the prior art using combustion of natural gas with oxygen preheated by means of the technology developed by the applicant company as described in EP-A-0 872 690;

Inv 1: relates to the implementation of the process according to the invention in a glass melting furnace with combustion of the syngas generated as sole fuel in the furnace with preheated oxygen as fuel oxidizer.

Table 2 gives a comparison between the process according to the invention (Ex. 1) and the three processes according to the prior art ($AA_1$ to $AA_3$) for a technical contribution or melting process identical to that produced in example $AA_1$ with a consumption of natural gas, used as fuel in the furnace, of 100 Nm³/h.

Table 3 gives a comparison between the process according to the invention and the three processes according to the prior art for an identical pull of the glass melting furnace.

TABLE 2

|  |  | $AA_1$ | $AA_2$ | $AA_3$ | Inv 1 |
|---|---|---|---|---|---|
| Fuel: natural gas | Nm³/h | 100 | 102 | 93 |  |
| Fuel temperature | ° C. | 25 | 25 | 450 | 450 |
| Fuel: syngas | Nm³/h |  |  |  | 350 |
| Overall consumption of natural gas (combustion and/or production of syngas) | Nm³/h | 100 | 102 | 93 | 73 |
| Δ Overall consumption of natural gas with respect to $AA_2$ |  |  |  | −8% | −28% |
| Δ Total natural gas with respect to $AA_1$ |  |  | 2% | −7% | −27% |
| Combustion air | Nm³/h | 1000 |  |  |  |
| Combustion air temperature | ° C. | 1200 |  |  |  |
| Oxygen (100%) | Nm³/h |  | 204 | 188 | 146 |
| Combustion oxygen temperature | ° C. |  | 25 | 550 | 550 |
| Energy supplied to the furnace | kW | 1462 | 1008 | 989 | 1039 |
| Heat discharged with the flue gases | kW | 694 | 240 | 221 | 271 |
| Thermal contribution to the melting process | kW | 768 | 768 | 768 | 768 |

TABLE 3

| Example |  | $AA_1$ | $AA_2$ | $AA_3$ | Inv 1 |
|---|---|---|---|---|---|
| Fuel: natural gas | Nm³/h | 900 | 828 | 762 |  |
| Fuel: syngas | Nm³/h |  |  |  | 2852 |
| Fuel temperature | ° C. | 25 | 25 | 450 | 450 |
| Overall consumption of natural gas (combustion and/or production of syngas) | Nm³/h | 900 | 828 | 762 | 597 |
| Δ Overall consumption of natural gas with respect to $AA_1$ |  |  | −8% | −15% | −34% |
| Fuel oxidizer flow rate: air | Nm³/h | 8900 |  |  |  |
| Fuel oxidizer flow rate: oxygen (100%) | Nm³/h |  | 1630 | 1498 | 1155 |
| Fuel oxidizer temperature | ° C. | 1200 | 25 | 550 | 550 |
| Combustion flue gases flow rate | Nm³/h | 10 918 | 3326 | 3129 | 3744 |
| Temperature of flue gases at the outlet of the furnace | ° C. | 1450 | 1450 | 1450 | 1450 |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A direct-fired heating process, in which process:
   (a) a feedstock to be heated is introduced into a furnace, wherein the furnace is a vitrification furnace or a furnace for the reheating or melting of metals,
   (b) fuel is burnt with the oxidant with generation of heat and flue gases in the furnace,
   (c) the feedstock is heated in the furnace with the heat generated,
   (d) the heated feedstock and the flue gases generated are discharged from the furnace, the discharged flue gases containing residual thermal energy,
   (e) syngas is produced in a synthesis reactor by an endothermic chemical reaction between reactants including (i) a carbon-based material and (ii) steam and/or $CO_2$, the synthesis reactor comprising at least one reaction region into which the reactants are introduced and in which the endothermic chemical reaction takes place and from where the syngas produced is extracted:

characterized in that:
   residual thermal energy is recovered from the flue gases discharged from the furnace, at least a portion of the residual thermal energy thus recovered being introduced into the synthesis reactor and consumed by the endothermic chemical reaction of stage (e), and at least a portion of the fuel burnt in the furnace in stage (b) is syngas produced in stage (e).

2. The process of claim 1, wherein the synthesis reactor also comprises at least one heating chamber into which said at least a portion of the recovered residual thermal energy is introduced, said at least one heating chamber being positioned, with respect to the at least one reaction region, so that recovered residual thermal energy is transferred from the at least one heating chamber to the endothermic chemical reaction in the at least one reaction region through at least one separating wall between the at least one heating chamber and the at least one reaction region.

3. The process of claim 2, wherein each reaction region is surrounded by a neighboring heating chamber or housed between two neighboring heating chambers.

4. The process of claim 2, wherein the synthesis reactor has a lamellar structure comprising an alternation of heating chambers and reaction regions, said heating chambers and reaction regions being situated between two successive plates.

5. The process of claim 1, wherein residual thermal energy is recovered from the discharged flue gases by heat exchange between the discharged flue gases and a heat-exchange fluid so as to obtain moderated flue gases and heated heat-exchange fluid containing the recovered residual thermal energy, at least a portion of the heated heat-exchange fluid being introduced into the synthesis reactor in order to provide the at least a portion of the recovered residual thermal energy to the endothermic chemical reaction of stage (e).

6. The process of claim 2, wherein residual thermal energy is recovered from the discharged flue gases by heat exchange between the discharged flue gases and a heat-exchange fluid so as to obtain moderated flue gases and heated heat-exchange fluid containing the recovered residual thermal energy, at least a portion of the heated heat-exchange fluid being introduced into the at least one heating chamber in order to provide the at least a portion of the recovered residual thermal energy to the endothermic chemical reaction of stage (e) through the at least one separating wall.

7. The process of claim 1, wherein the discharged flue gases are laden with dust and/or volatile substances capable of condensing at temperatures between 600° C. and 800° C. and in which the stage of recovery of residual thermal energy from the flue gases discharged from the furnace comprises at least a first phase of recovery at a first range of temperatures of the flue gases and a second phase of recovery at a second range of temperatures of the flue gases which is below the first range and in which:
at the temperatures of the first range of temperatures, there is no condensation of the volatile substances present in the flue gases, and
the flue gases are subjected to a cleaning operation between the first and the second phase of recovery, said cleaning operation comprising the removal of dust and/or of volatile substances which are capable of condensing at the temperatures of the second range of temperatures.

8. The process of claim 7, wherein a heat-exchange fluid is partially heated by heat exchange with the flue gases in the second phase of recovery and in which the heat-exchange fluid partially heated in the first phase of recovery is heated by heat exchange with the flue gases in the first phase of recovery.

9. The process of claim 8, wherein the heat-exchange fluid is chosen from air, nitrogen and steam.

10. The heating process of claim 1, wherein at least a portion and preferably all of the fuel is burnt in the furnace with an oxygen-rich oxidant.

11. The process of claim 8, wherein the furnace is a vitrification furnace or a furnace for the melting of metals.

12. The process of claim 1, wherein the endothermic chemical reaction is SMR or DMR or a mixture of the two.

13. The process of claim 1, wherein a portion of the thermal energy recovered from the discharged flue gases is used for at least one of the following purposes:
a) for preheating the carbon-based material before it is used as reactant in the endothermic chemical reaction;
b) for generating and/or superheating steam before it is used as reactant in the endothermic chemical reaction;
c) for preheating $CO_2$ before it is used as reactant in the endothermic chemical reaction;
d) for preheating the oxidant upstream of its use in the combustion of the fuel.

14. The process of claim 1, wherein water is extracted from the syngas by condensation before it is used as fuel in the furnace.

15. A heating plant suitable for the implementation of the process of claim 1, said plant comprising:
a furnace provided with an inlet for a feedstock to be heated, with an outlet for the heated feedstock, with one or more burners for the combustion of a fuel with an oxidant and the generation of heat for heating the feedstock, and with at least one outlet for flue gases,
a plant for the recovery of thermal energy by heat exchange between the discharged flue gases and the heat-exchange fluid and comprising an outlet for heated heat-exchange fluid, and
a reactor for the synthesis of syngas,
characterized in that:
the synthesis reactor is connected to the furnace so as to enable the provision of syngas produced in the reactor as fuel to at least one burner of the furnace;
the outlet for the flue gases from the furnace is connected to the plant for the recovery of thermal energy so as to enable the provision of flue gases resulting from the furnace to said recovery plant,
the outlet for the heated heat-exchange fluid from the plant for the recovery of thermal energy is connected to the reactor for the synthesis of syngas so as to enable the provision of at least a portion of the heated heat-exchange fluid to the synthesis reactor.

* * * * *